United States Patent [19]

Symons

[11] 4,020,238
[45] Apr. 26, 1977

[54] CONTROL OF GENERATION OF CHLORINE FEED FROM CHLORINE HYDRATE FOR USE IN A METAL CHLORINE ELECTRIC ENERGY STORAGE DEVICE

[75] Inventor: Philip C. Symons, Birmingham, Mich.

[73] Assignee: Energy Development Associates, Madison Heights, Mich.

[22] Filed: Apr. 7, 1975

[21] Appl. No.: 565,990

Related U.S. Application Data

[63] Continuation of Ser. No. 376,018, July 2, 1973, abandoned.

[52] U.S. Cl. .................................. 429/15; 429/25
[51] Int. Cl.² ....................................... H01M 8/04
[58] Field of Search .......... 136/86 R, 86 E; 424/22, 424/199, 15, 25

[56] References Cited

UNITED STATES PATENTS

| | | | |
|---|---|---|---|
| 3,133,837 | 5/1964 | Eidensohn | 136/86 R |
| 3,713,888 | 1/1973 | Symons | 136/86 R |
| 3,783,027 | 1/1974 | Bjorkman | 136/86 R |

Primary Examiner—Donald L. Walton
Assistant Examiner—H. A. Feeley

Attorney, Agent, or Firm—Ostrolenk, Faber, Gerb & Soffen

[57] ABSTRACT

A simple, inexpensive and trouble-free method of controlling the chlorine feed to a metal-chlorine battery system from a source of chlorine hydrate includes circulating aqueous electrolyte from an electrode compartment through a pump and recycled back to the electrode compartment, taking off a portion of the electrolyte, passing through a container of chlorine hydrate from which it releases chlorine and water, the chlorine generation increasing the pressure in the container, controlling the flow of electrolyte to the container, allowing the chlorine generated to flow from the container to the recycle line and back to the electrode compartment, which diminishes the pressure in the container, at which time electrolyte is again admitted to it, and the steps are continually repeated during the discharging of a battery system. An apparatus for carrying out the process of the invention includes a check valve between the pump and the container of hydrate which closes, preventing admission of the electrolyte to the container when the pressure increases enough to threaten to force the contents back through the line in which the check valve is located.

3 Claims, 1 Drawing Figure

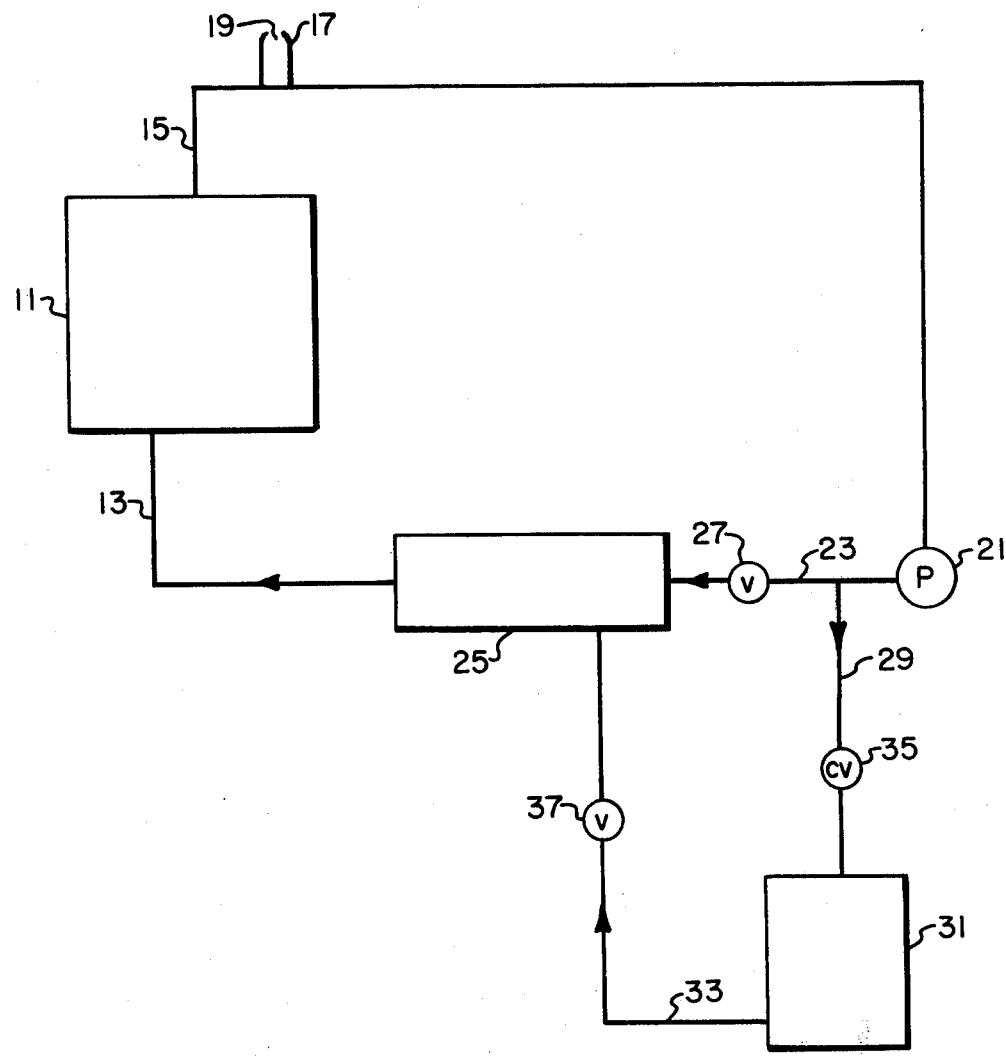

CONTROL OF GENERATION OF CHLORINE FEED FROM CHLORINE HYDRATE FOR USE IN A METAL CHLORINE ELECTRIC ENERGY STORAGE DEVICE

CROSS REFERENCE TO RELATED CASE

This case is a streamline continuation of U.S. Ser. No. 376,018 filed July 2, 1973, now abandoned.

BACKGROUND OF THE INVENTION

Chlorine hydrate, $Cl_2 \cdot 6H_2O$, has been employed as a source of chlorine for metal-chlorine high energy density batteries, particularly those utilizing zinc and a chlorine electrode. In U.S. Pat. No. 3,713,888, the operation of such a high energy density battery and the use of chlorine hydrate to generate the chlorine during charge for the battery are described and is hereby incorporated by reference.

In prior methods of utilizing chlorine hydrate as a source of chlorine for metal-chlorine batteries, the chlorine gas is generated by contacting the hydrate with electrolyte which is at a temperature above the decomposition temperature of the hydrate. The electrolyte is returned to the battery cells, normally through passageways in carbon or graphite electrodes, to release chlorine dissolved or dispersed in it and after conversion of the chlorine to chloride ion, the chlorine hydrate is again contacted with the electrolyte resulting and the process is continued. Means are usually provided for maintaining the temperature of the chlorine hydrate below its critical point when chlorine is not needed and other means may be provided for heating the hydrate to assist in releasing chlorine from it into the electrolyte to be fed back to the battery. Also, absorber or dissolver means may be provided for finely dispersing the chlorine, as bubbles, and aiding in dissolving it in the aqueous electrolyte prior to returning to the battery. Dissolved chlorine is considered to be more reactive than bubbles of chlorine in the battery.

To control release of chlorine hydrate during discharge periods comparatively complex controls have been specified in the past. Sensors have been positioned to determine when the electrode compartment requires more chlorine and indications by these that chlorine was needed resulted in starting of a pump and opening of a set of valves to permit electrolyte to be removed from the battery, forced through the chlorine hydrate source and fed back to the electrode compartment.

Because it is intended that the high energy density battery should be utilized on motor vehicles, it is important that the apparatus for feeding chlorine should be reliable, inexpensive, of minimum size and of as few working parts as possible. Previous apparatuses, including several electronically controlled valves and motors, in addition to being more expensive than that of the present invention, included more parts which could fail. Accordingly, efforts were made by the present inventor to discover a simpler, less expensive and more trouble-free apparatus and method and such efforts resulted in the making of the present invention.

SUMMARY OF THE INVENTION

In accordance with the present invention, a method of controlling the generation and feeding of chlorine from a source of chlorine hydrate to a metal-chlorine electric energy storage device in which electricity is produced as the chlorine is converted to chloride ion and the metal is converted to metal ion is provided which is an improvement over controls previously employed. By "metal-chlorine" is meant that the reactions during charge and discharge will occur at one electrode for the metal electrode and at the other electrode (of a cell) for the chlorine. The cells are combined into a battery of cells called an electrode compartment. In the process of generating and feeding chlorine which includes adding aqueous metal halide electrolyte from the battery to a source of chlorine hydrate at a lower temperature so as to convert a portion of the chlorine hydrate to chlorine and water, removing the chlorine and water from the source of hydrate with the electrolyte, dissolving at least a portion of the chlorine in the electrolyte containing water from the hydrate and returning the electrolyte with dissolved chlorine and said water to the electrode compartment for further discharge and conversion of the chlorine to chloride, the present invention is of the improved steps which include controlling the flow of electrolyte into the hydrate source when the pressure in the hydrate source or store increases due to the generation of chlorine from the hydrate and when the contents of the hydrate store would otherwise tend to flow out the electrolyte inlet and subsequently, when the pressure decreases, due to the removal of the generated chlorine from the hydrate store, flowing electrolyte from the battery into the store. Such operation is repeated and gives good control of chlorine feed to the battery from the chlorine hydrate. A preferred means for preventing electrolyte from entering the hydrate store is a check valve, which cooperates with a pump and a plurality of other valves to carry out the process automatically, without need of close supervision.

DESCRIPTION OF THE PREFERRED EMBODIMENTS

The present invention and its mode of operation will be apparent from the following description, taken in conjunction with the accompanying drawing in which:

The FIGURE is a schematic plan view of a metal-chlorine electric energy and storage device and apparatus for controllably adding chlorine to an electrolyte feed for the electrode compartment.

An electrode compartment composed of alternating electrodes of metal, such as zinc, in plate form, and graphite through which chlorine is fed, and in which the zinc is converted to zinc ions and the chlorine to chloride ions, accompanied by the generation of electricity, includes electrolyte feed and discharge conduits, lines, pipes or tubes 13 and 15, respectively. Conduit 15 includes vent 17, having an orifice 19, said vent usually being located near the outlet from the electrode compartment when the pressure at such point is slightly higher than atmospheric. Conduit 15 communicates with pump 21, which is preferably of the positive displacement type. Pump 21, operating during the time in which the battery system is discharging, pumps electrolyte from the electrode compartment through line 15 and discharges the electrolyte into line 23 from whence it passes through a dissolver or absorber 25 and then through inlet line 13 to the stack of electrodes in the electrode compartment. Thus, while the battery system is discharging, electrolyte of the desired content of chlorine dissolved therein and with some dispersed therein continuously circulates through the cells. Such circulation helps to maintain the chlorine content of the electrolyte feed to the graphite electrodes uniform throughout the electrode compartment, helping to produce more uniform dissolution of the zinc. In line 23 is an adjustable valve 27 which may be set so as to help control the proportion of electrolyte pumped through the recycle line (conduits 15, 23 and 13), compared to that pumped through a container of chlorine hydrate. This valve also helps to control the pressures in the lines of the recycle circuit.

When there is the desired content of chlorine in the circulating electrolyte there is no need for additional chlorine to be added unless it is being consumed in the electrode compartment. However, during operation of the battery system, when it is discharging, chlorine is always being consumed and so at such times it is desirable to have a steady feed or flow of chlorine in the right proportion to raise the chlorine concentration in the electrolyte to the desired level. It has been found that saturation or a slight excess over saturation is a useful and very desirable concentration of chlorine in the aqueous electrolyte (usually aqueous zinc chloride). By means of the present invention such a constant rate of feed may be maintained. What is more, when the electrical discharge from the battery system is of an irregular nature only enough chlorine gas will be added to the circulating electrolyte so as to keep the electrolyte saturated with chlorine or slightly above saturation. By means of the present invention this is possible without the requirement of elaborate sensing devices and controls.

When there is a deficiency of chlorine in the electrolyte feed to the electrode compartment, pump 21 will deliver some electrolyte to line 29, thence to the hydrate store 31. The electrolyte will contact the chlorine hydrate or a portion thereof and will cause some of it to be decomposed, whereby chlorine will be released. As illustrated, the electrolyte will pass to the bottom through line 33 when check or non-return valve 35 is closed, due to the development of pressure in the store from the generation of the chlorine (and accompanying water). The electrolyte and gaseous chlorine then pass through regulating valve 37 into absorber or dissolver 25, wherein the chlorine is brought into intimate contact with the electrolyte, which may be effected by passing through small orifices or fine passageways in contact with the electrolyte, and the enriched electrolyte is returned to the stack of cells via line 13. In situations where in-line mixing is employed in line 33 or where sufficient dissolving and dispersing are obtained in that line, the absorber may be omitted or may be modified. In such cases, the electrolyte and chlorine may be returned directly via line 33 to line 23, downstream of valve 27, or to line 13, shortly before return to the electrode compartment.

In operation the system is foolproof, requires little or no maintenance or outside control and is very economical. Pump 21 may be kept in continuous operation, whether or not the battery system is being charged or discharged, or it may be shut down during idle periods. If operation is to be intermittent it may be desirable to provide means, not illustrated, for closing off the venting opening, so as to prevent unnecessary loss of chlorine from the system during no-discharge periods. During normal operation, the valves 27 and 37 are adjusted to provide the desired ratio of back pressures in the closed system so that when the pressure in line 13 falls, due to comsumption of chlorine in the battery during discharge, and such pressure drop is communicated to the hydrate store through valve 37 and line 33, the restriction caused by valve 27 will be that desirable to allow flow of electrolyte and gas from the hydrate store back to the electrode compartment without allowing return flow of recycling electrolyte to the hydrate store through line 33. In other words, the pressure drop across valve 27 will balance the sum of the pressure drops across valve 37, due to the resistance of line 33 and due to that of the hydrate store, during flow, after the opening of valve 35, so that recycling electrolyte will not enter the hydrate store except through line 29 and valve 35, and, of course, chlorine and electrolyte solution from the hydrate store will not feed back toward pump 21 through line 23 or line 29. When valve 35 is open the pressure drop across valve 27 will balance with that across valves 35 and 37 and the resistances of lines 29 and 33, together with whatever small resistance to flow is caused by the hydrate store design, to allow feed through the hydrate store and return to the recycle line without any undesirable feedback. After such controls have been set for normal operation they normally will not have to be changed, except for minor adjustments during the battery system operation.

During electrical discharge chlorine will be consumed and the pressure in the system will decrease, at which stage check valve 35 will allow passage of electrolyte into the hydrate store and development of chlorine. This in turn, will increase the pressure in the system, causing valve 35 to close and the electrolyte will continue to be fed to the electrode compartment until the chlorine is substantially all consumed, at which point the pressure will drop so that again electrolyte will be allowed to flow through non-return valve 35 into the hydrate store, and the operation will be repeated.

Vent 17 is shown schematically in the drawing to be located in a convenient place for venting of chlorine gas. However, the vent may be in other locations in the system and its presence is not required by the invention. Its utility is best demonstrated in systems in which there is always a slight excess of undissolved chlorine in the electrolyte, even after passing through the electrode compartment. In such cases, the continuous venting removes any harmful gases or vaporized liquids that may be produced during the electrolytic reaction, which materials, if their concentration increases too much, can cause interference with the electrochemical reaction and diminution of electrical discharging capability. Other locations for the vent may be in the cells themselves, in a manifold in the electrode compartment, and before the inlet to the electrode compartment. Even in those instances where no objectionable gases have to be vented, a slight venting effect (the orifice is very small) is useful in maintaining a measure of flow of materials through the system and helping to prevent to some extent any stagnation or deposits on system parts because of a complete lack of flow.

The venting orifice is preferably provided with a no-return cap so as to prevent any leakage of air back into the system. Also, when desired, means are provided so that the chlorine and other gases vented are recaptured, the impurities are removed and the chlorine is circulated back into the lines.

The system has been described with respect to discharging of electricity from the battery system but, insofar as venting is concerned, may also operate during charging. However, it will be clear that during the charging operation, in which chlorine is produced, rather than consumed, there will be no need for release of any chlorine from the hydrate store but rather chlorine hydrate will be formed by cooling the electrolyte and reacting chlorine and water under appropriate temperature and pressure conditions.

The materials of construction employed are those which can withstand aqueous zinc chloride containing wet chlorine. Although iron and steels are useful it is preferred that valve parts be titanium, titanium alloy, polytetrafluoroethylene or similar resistant metal, alloy or plastic. Although aqueous zinc chloride is the electrolyte normally employed, other metal electrodes can be utilized, such as those of iron, nickel, chromium and alloys thereof and other inert electrodes can take the place of the graphite for the chlorine electrode. The temperature of the electrolyte will usually be in the range of 15° C. to 50° C. and the temperature of the hydrate store will normally be held below 5° C. and can be as low as −20° C. Preferably, it is of −5° C. to +5° C. The pressure in the system will be positive, usually being from one inch of water to one atmosphere and preferably being from 0.5 to 5 lbs./sq. inch, although much higher pressures can also be developed by the positive displacement pumps preferred. Instead of the described pumps, one may utilize centrifugal pumps of suitable performance characteristics.

The proportion of circulating electrolyte passing through the hydrate store on the average will be from 0.1 to 10%, preferably from 1% to 5% of the total electrolyte volume when the battery system is discharging continuously. The non-return valve will prevent flow of electrolyte into the hydrate store, as soon as reverse flow is initiated due to high pressure in the hydrate store. Normally, as little as one inch of water pressure differential is enough to cause the check valve to close, but less sensitive valves, those with requirements of a 0.5 lb./sq. in. differential, may be satisfactorily employed. Of course, absolute flow rates in the system depend on the size of the battery system but normal flow rates based on electrolyte circulation through the electrode compartment may range from about 0.1 to about 3.0 cc/minute/cm$^2$ of electrode area. The electrolyte concentrations may range from 10% to 40% by weight most preferably, 15%–35% of saturation of the metal halide in water. The most preferred metal halide is zinc chloride.

The invention has been described with respect to preferred embodiments, but is not to be limited only to those because it is evident that equivalents and substitutes may be employed without departing from the spirit and scope of the invention.

What is claimed is:

1. An apparatus for controlling the generation and feeding of chlorine from a source of chlorine hydrate during the discharge of an electric energy storage device having an electrode compartment with a stack of metal-chlorine electrodes therein and also having an inlet means and an outlet means connected by a first conduit so as to provide a continuous electrode compartment loop, said device further having a storage compartment with an inlet means and outlet means and being adapted to contain the source of chlorine hydrate, pumping means for flowing an electrolyte in the continuous loop and which pumping means pumps continuously during discharge, a second conduit connecting said first conduit at a first point downstream of said pumping means with said storage compartment inlet means, check valve means located in the second conduit adapted to prevent backflow out from the storage compartment inlet means in response to pressure buildup in the storage compartment as the chlorine hydrate therein decomposes, a third conduit means connecting the storage compartment outlet means with said first conduit at a second point downstream of said first point and adapted to provide for flow of the decomposition products of the chlorine hydrate and electrolyte to said first conduit, a first adjustable valve means located in said first conduit between said first and second points, a second adjustable valve means located in the third conduit, said first and second adjustable valve means being adapted to be adjusted such that the pressure drop across the first adjustable valve means will balance the sum of the pressure drops across the second adjustable valve means, the resistance of the third conduit and due to the hydrate storage during flow when the check valve means is open.

2. An apparatus according to claim 1 further comprising a dissolver means at said second point adapted to mix and dissolve chlorine from the source of chlorine hydrate with flowing electrolyte.

3. In a method for operating an electric energy storage device during discharge, said device having an electrode compartment with a stack of cells having metal-chlorine electrodes during the discharge phase of said device, wherein chlorine is converted into chloride ion and the metal is converted to metal ion, said electrode compartment having an electrolyte inlet and outlet, a storage compartment having an electrolyte inlet and outlet and a source of chlorine hydrate therein, wherein aqueous metal halide electrolyte from the electrode compartment is conveyed to the source of chlorine hydrate, which is at a lower temperature than the electrolyte, so as to convert a portion of the chlorine hydrate to chlorine and water, the chlorine and water is removed from the source of hydrate with the elecrolyte, at least a portion of the chlorine is dissolved in the electrolyte containing water from the hydrate and the electrolyte with dissolved chlorine and water is returned to the electrode compartment, the improvement which comprises connecting the electrode compartment inlet and outlet so as to form a first loop and continuously flowing said metal halide electrolyte around said first loop, connecting the storage compartment inlet and outlet to said first loop so as to form a second loop, providing a check valve in the second loop upstream of the storage compartment electrolyte inlet responsive to the back pressure caused by the generation of chlorine from the hydrate, providing an adjustable valve means in said second loop downstream of said storage compartment outlet, providing an adjustable valve means in said first loop disposed intermediate of said second loop, and adjusting the two adjustable valve means such that the pressure drop across the adjustable valve means in the first loop balances the sum of the pressure drop across the second loop when the check valve is open.

* * * * *